3,399,959
STABLE GRANULAR SODIUM
TRIPOLYPHOSPHATE
James A. Robertson, Levittown, Pa., assignor to
FMC Corporation, New York, N.Y., a corporation of Delaware
Filed Oct. 26, 1964, Ser. No. 406,341
7 Claims. (Cl. 23—106)

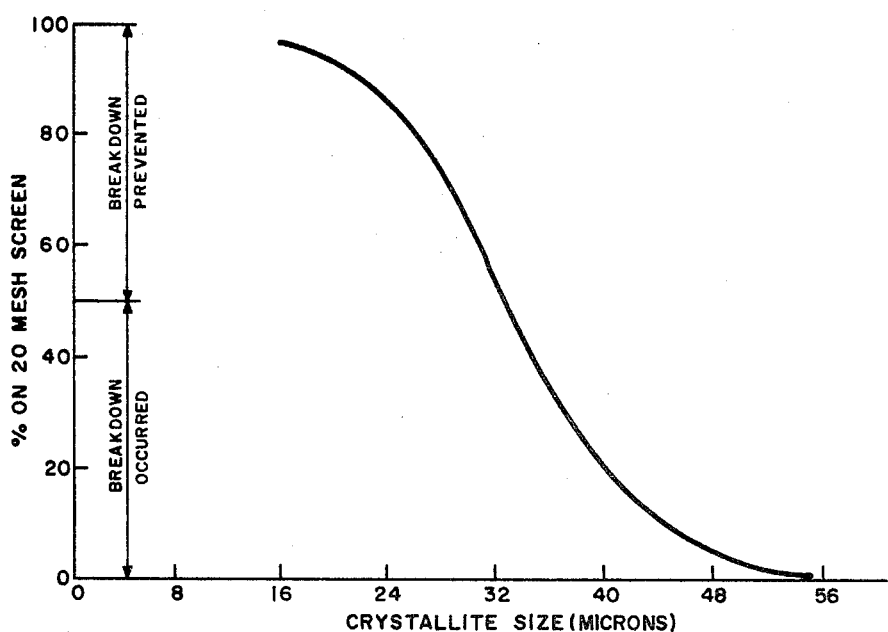

ABSTRACT OF THE DISCLOSURE

The spontaneous structural disintegration of a particulate, granular sodium tripolyphosphate product having a size larger than 100 mesh and containing Form I sodium tripolyphosphate is materially reduced by adding an effective amount (up to about 10 mole percent) of a crystal growth inhibitor to the precursor sodium phosphate mixture used in making up said product; the crystal growth inhibtor prevents the growth of crystallites of sodium tripolyphosphate in said product larger than about 35 microns. The effective crystal growth inhibitors are (a) monovalent cations having ionic radii above about 0.95 A. and (b) divalent cations having ionic radii below about 1.00 A. and (c) anions selected from the group consisting of fluorides, sulfates, silicates, and borates.

---

This invention relates to a method for obtaining a stable sodium tripolyphosphate granular product, and more particularly to a method of preventing the structural disintegration of granular sodium tripolyphosphate.

Sodium tripolyphosphate ($Na_5P_3O_{10}$) is widely employed as the principal cleaning aid in detergent mixtures. One method for producing sodium tripolyphosphate product is to react phosphoric acid and an alkaline compound such as sodium hydroxide or sodium carbonate together in an aqueous solution such that the mole ratio of sodium to phosphorus is on the order of about 1.67:1. This reaction results in the formation of an aqueous mixture containing the equivalent of monosodium orthophosphate and disodium orthophosphate in a mole ratio of 1:2. The free water is removed from the above phosphate solution by passing the liquid into a heating zone where it is progressively heated to a temperature of about 350° C. or higher, during which sodium tripolyphosphate is formed. The exact mole ratio of sodium to phosphorus which is employed may be varied to suit the individual needs of the producer. The ultimate reaction may be considered as proceeding according to the following:

$NaH_2PO_4 + 2Na_2HPO_4 \rightarrow Na_5P_3O_{10} + 2H_2O$

The resulting tripolyphosphate which is formed is a crystalline anhydrous product, capable of having two distinct crystalline forms. Form I is produced at temperatures of from about 500–620° C. while Form II is produced at temperatures below about 500° C. sodium tripolyphosphate granular product is made up conventionally of an intimate mixture of Form I and Form II crystalline configurations. The proportion of Form I to Form II can be adjusted where desired to suit the needs of the specific detergent compounder.

The product coming from the heating apparatus is generally in agglomerated form. The agglomerates are cooled and sized to yield a sodium tripolyphosphate product which is separated into granules having a size greater than about 100 mesh (and preferably about 0.005–0.50 inch in diameter), and a more finely powdered sodium tripolyphosphate, which is sold as a separate product.

A most serious problem that has arisen with granular sodium tripolyphosphate which contains both Form I and Form II crystalline configurations is that this product is subject to spontaneous structural disintegration on cooling and on storage. When this structural disintegration takes place the sodium tripolyphosphate crystals in the granular product suddenly disintegrate and the product is converted into a fine powder. This structural disintegration does not necessarily occur throughout the entire unit quantity of product but may occur only to a small fraction of the entire shipment. Nevertheless, this disintegration is most serious because the fines content of the resultant shipment then exceeds the specifications of the product as set by detergent compounders. These specifications define the maximum fines content which can be tolerated by the compounder in making up a detergent product having the properties desired for retail marketing.

This spontaneous, structural disintegration is particularly offensive because in many cases, sodium tripolyphosphate granular product is produced which readily meets specification when shipped from the plant. However, by the time the product reaches the detergent compounder spontaneous, structural disintegration has occurred during shipment and the shipment is no longer acceptable because of its high fines content. An added difficulty is that this disintegration of sodium tripolyphosphate occurs sporadically among various units of product made under identical manufacturing conditions without any apparent consistency. Moreover, no explanation or mechanism has been proposed heretofore which fully expains this phenomenon or reveals a simple inexpensive method to obviate disintegration.

One technique for controlling a form of structural disintegration, i.e. decrepitation, is set forth in co-pending U.S. application No. 316,642, now U.S. Patent 3,322,493, filed in the name of Raimond Pals on Oct. 16, 1963 and assigned to the assignee of the present application. In this application the granular product, which is produced in a conventional manner, is cooled in an atmosphere containing minimum amounts of water vapor. While this technique of cooling in a controlled atmosphere prevents decrepitation, it requires special equipment designed to control the cooling atmosphere of the sodium tripolyphosphate and therefore is costly. Accordingly, a simpler, cheaper process is desired to prevent this granular disintegration.

I have now found that the spontaneous structural disintegration of granular sodium tripolyphosphate product, which granular product is produced by heating an aqueous sodium phosphate mixture to temperatures of at least about 350° C., can be substantially reduced or eliminated by adding effective amounts (up to about 10 mole percent) of a crystal growth inhibitor to a sodium phosphate mixture to prevent the growth of crystallites of sodium tripolyphosphate in the granular product larger than about 35 microns. A crystallite is that portion of an anhedral crystalline solid that is optically homogeneous under microscopic examination.

The crystal growth inhibitors which have been found effective are those compounds that supply monovalent cations having ionic radii greater than 0.95 A. and those that supply divalent cations that have ionic radii less than about 1.00 A. The monovalent cations include potassium, rubidium, cesium, copper, silver, gold, gallium, indium, and thallium. The divalent cations include beryllium, magnesium, calcium, titanium, chromium, manganese, iron, cobalt, nickel, zinc, rhodium, palladium, cadmium and platinum. In addition certain anions are effective as crystal growth inhibitors. These include the fluoride ion, the sulfate ion, the silicate and the borate ions.

In one preferred method for carrying out the present invention, sodium tripolyphosphate is produced by passing an aqueous mixture containing the equivalent of monosodium orthophosphate and disodium orthophosphate in a mole ratio of about 1:2, along with the added crystal growth inhibitor, through a heated zone to remove free water. The resultant mixture is then progressively heated to an initial temperature of at least about 350° C. in order to form the Form II sodium tripolyphosphate. As the Form II sodium tripolyphosphate is heated to higher temperatures on the order of about 500° C. or above, substantial portions of the Form II sodium tripolyphosphate are converted to Form I. The equilibrium transition has been determined at about 417° C. ±8° C. The extent of the conversion of Form II to Form I depends upon the temperature which is employed and the duration of heating at these temperatures. Conventionally, the granular sodium tripolyphosphate thus produced contains both Form I and Form II in order to meet specified physical property requirements of detergent compounders.

The resultant product is removed from the kiln and is ground and screened to obtain a product having a size larger than about 100 mesh and a density from about 0.85 to about 1.05 g./cc. The grinding and screening process can be done before the material has cooled or when it is at room temperature. Cooling is generally effected by a rolling drum similar to a rotary kiln in which the product is tumbled within the drum while a current of cool air is passed over the granules. The resultant product has been found to be substantially free of spontaneous structural disintegration and can be shipped and stored without formation of powdered sodium tripolyphosphate.

In carrying out the present invention the crystal growth inhibitor is added to the sodium phosphate prior to converting this precursor composition to sodium tripolyphosphate. The most convenient way to incorporate this crystal growth inhibitor in plant production is to add it to the aqueous solution of sodium phosphate. Alternately, the product obtained by evaporating this aqueous mixture of sodium phosphate, namely, an ortho-mix of sodium orthophosphates, can be blended with the crystal growth inhibitor prior to charging this ortho-mix to a kiln for conversion to sodium tripolyphosphate. In any event, the crystal growth inhibitor must be present along with the precursor material during the formation of sodium tripolyphosphate crystallites. The amount of crystal growth inhibitor which is added depends in part upon the specific inhibitor utilized and whether it is a cation or anion. In general, cation inhibitors are effective at the 5 mole percent level, whereas larger amounts of anion inhibitors, up to about 10 mole percent, are required.

The exact reason for this spontaneous structural disintegration is not known, but it is believed that the following explains the mechanism for the disintegration and the reason the crystal growth inhibitor prevents the subsequent spontaneous disintegration of granular sodium tripolyphosphate after cooling and standing. Initially the sodium tripolyphosphate exists in two crystalline species termed Phase I and Phase II. Phase II, the lower temperature crystalline species, is transformed at temperatures above about 417° C. ±8° C. into the high temperature Phase I species which is metastable at atmospheric temperatures. When a product containing both Phase I Phase II is cooled, some Phase I crystallites convert to Phase II and develop internal strains during the cooling process because of a 2.7% volume decrease that occurs during this conversion. In many cases these internal strains cannot be accommodated without structural disintegration of the crystallite.

Thus, the internal strains within the crystallite that lead to its spontaneous structural disintegration appear to develop because of the conversion of high temperature Phase I to the lower temperature Phase II during cooling of the product. Since the 2.7% volume decrease that occurs during this conversion cannot be accommodated by some crystallites of sodium tripolyphosphate, these crystallites disintegrate and form powdered sodium tripolyphosphate (fines).

The above spontaneous structural disintegration is believed to occur only when the crystallite is sufficiently large that it is unable to accommodate the transition from Phase I to Phase II. The smaller Phase I crystallites appear to cool without going through the transition from Phase I to Phase II and thus avoid any substantial disintegration. The conditions that lead to the growth of large Phase I crystallites during manufacture are sustained heating periods at high temperatures. Unfortunately, these are precisely the conditions that are present when sodium tripolyphosphate is produced in the conventional rotary kiln process.

In order to reduce the size of the sodium tripolyphosphate crystallites that are obtained in the final product, compounds are added to the precursor sodium phosphate whose ions are effective as crystal growth inhibitors. It is believed that these ions are effective by entering the sodium tripolyphosphate crystalline structure. In the case of the monovalent and divalent cations, these ions are believed to be substituted for the sodium ion in the make-up of the crystalline sodium tripolyphosphate. It is believed that this can occur because the ionic radii of these cations is sufficiently close to that of the sodium ion as to allow free substitution therefor. In the case of the anions, these replace either the oxygen or the $PO_4$ tetrahedron in the sodium tripolyphosphate crystal. Similarly, this is made possible because the fluoride ion has an ionic radii close to that of the oxygen atom while other ions, e.g. sulfate ions and borate ions, have ionic radii sufficiently close to that of the phosphate ion so as to permit free substitution therefor. As a result of the introduction of these foreign ions into the sodium tripolyphosphate crystal, the resultant granular product has been found to have smaller crystallites, e.g. below 35 microns, and to have little or no tendency to disintegrate on cooling or on storage.

The relationship between disintegration and crystal size can best be demonstrated by reference to FIG. 1.

In FIG. 1 there is shown a graphic representation in which the crystallite size in microns of sodium tripolyphosphate granular product is plotted on the abscissa axis. The resistance to breakdown is plotted on the ordinate axis by measuring the percent of the sample which remains on a 20 mesh screen (100% represents no breakdown) after cooling. The sodium tripolyphosphate crystallite size was controlled by adding certain crystal growth inhibitors to the precursor ingredients used in preparing the sodium tripolyphosphate crystallites by the method set forth in Example 4. As will be readily observed, half the sample (50%) breaks down when the crystallite size reaches about 32 microns in diameter. As the crystallite size increases, disintegration also increases; conversely, as crystallite size decreases structural disintegration also decreases. A 50% structural disintegration of the samples or greater has been arbitrarily selected as being excessive and beyond the limits which can be satisfactorily tolerated in the final product. Accordingly, where breakdown does not exceed 50% of the samples, breakdown has been considered to be controlled within the desired proportions.

The additives which can be used as crystal growth inhibitors are those compounds which can supply the following monovalent cations: potassium, rubidium, cesium, copper, silver, gold, gallium, indium, and thallium; and the following divalent cations: beryllium, magnesium, calcium, titanium, chromium, manganese, iron, cobalt, nickel, zinc, rhodium, palladium, cadmium, and platinum. In general, the monovalent cations have ionic radii of greater than about 0.95 A., while the divalent cations have ionic radii less than about 1.00 A. Cations having these ionic radii are believed to be readily substituted for the sodium ion and therefore may enter into the sodium tripolyphosphate crystal lattice. The anions which have been found effective as crystal growth inhibitors include the fluoride, sulfate, silicate, and borate anions. These anions are believed to enter the sodium tripolyphosphate crystal lattice in place of either the oxygen atom or the phosphate tetrahedron.

In Table I below there are listed a number of cations and anions which are representative of the class of crystal growth inhibitors useful in the present invention. The threshold levels at which these crystal growth inhibitors are useful are listed in the corresponding column of Table I.

TABLE I

| Crystal growth inhibitor ion: | Mole, percent |
|---|---|
| $K^+$ | 1.0 |
| $Cs^+$ | 0.8 |
| $Ca^{++}$ | 2.1 |
| $Mg^{++}$ | 5.0 |
| $SO_4^=$ | 6–9 |
| $Mg^{++}+SO_4^=$ | 2.4 |
| $B_4O_7^=$ | 3–7 |
| $F^-$ | 5–8 |

As will be observed from Table I, most of the cations are effective at ranges of up to about 5 mole percent, whereas the anions require up to about 10 mole percent. When both the cation and anion of a compound are effective crystal growth inhibitors, the required amount of compound supplying these ions is reduced. For example, the sulfate anion requires from 6–9 mole percent to be effective, and the magnesium cation requires about 5 mole percent to be effective. However, when magnesium sulfate is utilized as the compound supplying the crystal growth inhibitor ions, only 2.4 mole percent of the added magnesium sulfate is required to obtain the desired crystal growth inhibition.

In order to be effective, the compound added as a crystal growth inhibitor must be sufficiently soluble in the melt to supply the desired cation or anion. These crystal growth inhibitors are believed to operate to prevent the growth of the sodium tripolyphosphate crystallites by entering the crystal lattice of the Phase I sodium tripolyphosphate and either producing compensating strains, or providing strain relieving discontinuities. This action inhibits the growth of larger sodium tripolyphosphate crystallites and thus obviates the problem of spontaneous, structural disintegration of the granular product.

The following examples are given to illustrate the present invention but are not deemed to be limiting thereof.

Example 1.—Manufacture of ortho-mix

An "ortho-mix" containing the equivalent of monosodium orthophosphate and disodium orthophosphate in a mole ratio of 1:2, was prepared as a precursor of sodium tripolyphosphate, by adding soda ash and phosphoric acid to water in sufficient quantities to obtain a final solution having a mole ratio of Na/P of about 1.67:1 and a density of 55° Bé. The heat of reaction was sufficient to increase the temperature of the solution to about 100° C. and drive off most of the carbon dioxide that formed. The resulting solution was fed to commercial rotary kiln drier to remove the free water and to obtain a mixture of dry orthophosphate salts. The salt product was identified as monosodium orthophosphate and disodium orthophosphate in a mole ratio of 1:2.

Example 2

A 5.0 g. mixture was made up containing 95 mole percent of the ortho-mix prepared in Example 1 and 5 mole percent of potassium nitrate. The mixture was blended thoroughly and was pressed into ¼ inch thick tablets under a pressure of 10,000 p.s.i. The tablets were broken up into ¼ inch square lumps, shaken for one minute on a 20 mesh sieve to eliminate the nonadhering, powdery fraction. A sample of hard rigid cubes was selected from the +20 mesh fraction and was heated for one hour at 550±10° C. in a steam atmosphere. The cubes were then cooled for two minutes on a 20 mesh sieve and shaken for one minute. The fraction (weight percent) that remained on the 20 mesh sieve and the fraction (weight percent) that went through the screen was determined. In addition, the crystallite size of the sodium tripolyphosphate in the cubes was determined by microscopic examination. This was done by measuring the maximum diameter of the crystallites (the optically homogeneous portions) of the anhedral crystalline mass that makes up the sodium tripolyphosphate product. A control sample containing no additive other than the ortho-mix was also tested in the same manner. The results are given below in Table II.

TABLE II

| Sample | On 20 mesh screen (wt. percent) | Through 20 mesh screen (wt. percent) | Crystallite size (microns) |
|---|---|---|---|
| Control | 0 | 100 | 50 |
| KNO₃ additive | 100 | 0 | 20 |

In the above table the potassium ion is the crystal growth inhibitor and at 5 mole percent stops spontaneous structural disintegration.

Example 3

In order to determine the effective amount of potassium ion that is needed in order to prevent spontaneous structural disintegration, the procedure of Example 2 was repeated using different mole percents of potassium nitrate. The results are reported in Table III.

TABLE III

| Mole percent KNO₃ added | On 20 mesh screen (wt. percent) | Through 20 mesh screen (wt. percent) | Crystallite size (microns) |
|---|---|---|---|
| 0 (control) | 0 | 100 | 50 |
| 0.50 | 2 | 98 | 40 |
| 0.75 | 26 | 74 | 32 |
| 1.00 | 52 | 48 | 32 |
| 1.25 | 69 | 31 | 35 |
| 1.50 | 90 | 10 | 30 |
| 1.75 | 84 | 16 | 16 |
| 2.00 | 100 | 0 | 24 |

Example 4

The procedure of Example 2 was repeated except that in place of potassium nitrate various amounts of other additives were used as specified below in Table IV. The results obtained are listed in Table IV. This table also indicates the ion which is the crystal growth inhibitor.

TABLE IV

| Additive | Mole percent of additive | Active ion | On 20 mesh screen (wt. percent) | Through 20 mesh screen (wt. percent) | Crystallite size (microns) |
|---|---|---|---|---|---|
| Control | 0 |  | 0 | 100 | 50 |
| CaBr$_2$ | 1.00 | Ca$^{++}$ | 0 | 100 | 37 |
| CaBr$_2$ | 2.00 | Ca$^{++}$ | 27 | 73 | 32 |
| CaBr$_2$ | 2.25 | Ca$^{++}$ | 41 | 59 | 42 |
| CaBr$_2$ | 2.40 | Ca$^{++}$ | 84 | 16 | 24 |
| CaBr$_2$ | 2.50 | Ca$^{++}$ | 94 | 6 | 24 |
| CaBr$_2$ | 3.00 | Ca$^{++}$ | 99 | 1 | 16 |
| MgSO$_4$ | 1.00 | Mg$^{++}$SO$_4^=$ | 10 | 90 | 40 |
| MgSO$_4$ | 2.00 | Mg$^{++}$SO$_4^=$ | 8 | 92 | 64 |
| MgSO$_4$ | 2.25 | Mg$^{++}$SO$_4^=$ | 13 | 87 | 30 |
| MgSO$_4$ | 2.40 | Mg$^{++}$SO$_4^=$ | 98 | 2 | 10 |
| MgSO$_4$ | 2.50 | Mg$^{++}$SO$_4^=$ | 75 | 25 | 8 |
| MgSO$_4$ | 3.00 | Mg$^{++}$SO$_4^=$ | 99 | 1 | 16 |
| Be(NO$_3$)$_2$·4H$_2$O | 5 | Be$^{++}$ | 77 | 23 | 32 |
| Mg(C$_2$H$_3$O$_2$)$_2$ | 5 | Mg$^{++}$ | 52 | 48 | 24 |
| CaBr$_2$·2H$_2$O | 5 | Ca$^{++}$ | 96 | 4 | 20 |
| CuCl | 5 | Cu$^+$ | 62 | 38 | 30 |
| AgNO$_3$ | 5 | Ag$^+$ | 84 | 16 | 24 |
| ZnCl$_2$ | 5 | Zn$^{++}$ | 100 | 0 | 20 |
| CdCl$_2$ | 5 | Cd$^{++}$ | 85 | 15 | 30 |
| CoCl$_2$·6H$_2$O | 5 | Co$^{++}$ | 100 | 0 | 32 |
| Ni(C$_2$H$_3$O$_2$)$_2$·4H$_2$O | 5 | Ni$^{++}$ | 87 | 13 | 24 |
| Mn(C$_2$H$_3$O$_2$)$_2$·4H$_2$O | 5 | Mn$^{++}$ | 98 | 2 | 20 |
| NaF | 5 | F$^-$ | 100 | 0 | 24 |
| Na$_2$B$_4$O$_7$·10H$_2$O | 5 | B$_4$O$_7^=$ | 100 | 0 | 8 |
| KBr | 1 | K$^+$ | 66 | 34 | 24 |
| KNO$_3$ | 2.0 | K$^+$ | 100 | 0 | 24 |
| CsCl | 1.50 | Cs$^+$ | 92 | 8 | 24 |
| Mg(C$_2$H$_3$O$_2$)$_2$·4H$_2$O | 7 | Mg$^{++}$ | 96 | 4 | 16 |

The results of Table IV with respect to the crystallite size and the fraction which remained on the 20 mesh screen were plotted in the attached drawing. The crystallite size is plotted on the abscissa axis and the percent remaining on the 20 mesh sieve is plotted on the ordinate axis. The curve best fitting the data is shown in the drawing. As will be observed from the drawing, spontaneous structural disintegration in amounts of 50 weight percent of the sample does not occur where the crystallite size of the granular sodium tripolyphosphate is below about 32 microns. For purposes of evaluating the data, the crystal growth inhibitor is considered successful if greater than 50 weight percent remains on the 20 mesh screen.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. In the process for producing a particulate, granular sodium tripolyphosphate product, having a size greater than 100 mesh and containing Form I sodium tripolyphosphate, wherein said product is produced by heating a sodium phosphate mixture having sodium and phosphorus values in a mole proportion sufficient to produce sodium tripolyphosphate to temperatures above about 350° C., and wherein said granular sodium tripolyphosphate product is subject to spontaneous structural disintegration, the improvement which comprises adding an effective amount of a crystal growth inhibitor to said sodium phosphate mixture to prevent the growth of sodium tripolyphosphate crystallites in said granular sodium tripolyphosphate product to a size larger than about 35 microns, and recovering a sodium tripolyphosphate product in which spontaneous structural disintegration is reduced.

2. Process of claim 1 wherein said crystal growth inhibitor is employed in amounts up to about 10 mole percent of said granular sodium tripolyphosphate product.

3. Process of claim 1 wherein said crystal growth inhibitor is a salt which will yield potassium cations in said sodium phosphate mixture.

4. In the process for producing a particulate, granular sodium tripolyphosphate product, having a size greater than 100 mesh and containing Form I sodium tripolyphosphate, wherein said product is produced by heating a sodium phosphate mixture having sodium and phosphorus values in a mole proportion sufficient to produce sodium tripolyphosphate to temperatures above about 350° C., and wherein said granular sodium tripolyphosphate product is subject to spontaneous structural disintegration, the improvement which comprises adding an effective amount of a crystal growth inhibitor to said sodium phosphate mixture to prevent the growth of sodium tripolyphosphate crystallites in said granular sodium tripolyphosphate product to a size larger than about 35 microns, said crystal growth inhibitor being a compound that supplies ions selected from the group consisting of (a) monovalent cations having ionic radii above about 0.95 A. and
(b) divalent cations having ionic radii below about 1.00 A. and
(c) anions selected from the group consisting of fluorides, sulfates, silicates, and borates.

5. Process of claim 4 in which the monovalent cations are selected from the group consisting of potassium, rubidium, cesium, copper, silver, gold, gallium, indium, and thallium; and the divalent cations are selected from the group consisting of beryllium, magnesium, calcium, titanium, chromium, manganese, iron, cobalt, nickel, zinc, rhodium, palladium, cadmium, and platinum.

6. Process of claim 1 wherein said particulate, granular sodium tripolyphosphate has a size of 0.005 to 0.50 inch in diameter.

7. Process of claim 4 wherein said crystal growth inhibitor is employed in amounts up to about 10 mole percent of said sodium tripolyphosphate mixture.

References Cited
UNITED STATES PATENTS

| 2,204,357 | 6/1940 | Heckert | 23—239 |
| 2,204,358 | 6/1940 | Heckert et al. | 23—239 |
| 2,324,124 | 7/1943 | Williams | 252—8.5 |
| 2,712,529 | 7/1955 | Mills et al. | 252—138 |
| 2,844,437 | 7/1958 | Kramer et al. | 23—106 |
| 2,948,588 | 8/1960 | Baumann | 23—106 |
| 3,322,493 | 5/1967 | Pals | 23—106 |

OSCAR R. VERTIZ, Primary Examiner.

L. A. MARSH, Assistant Examiner.